United States Patent [19]

Motovik

[11] Patent Number: 5,172,509
[45] Date of Patent: Dec. 22, 1992

[54] DEVICE FOR PREVENTING DAMAGE TO A FISHING FLY HACKLE

[76] Inventor: William Motovik, Perimeter Rd., Kinnelon, N.J. 07405

[21] Appl. No.: 690,079

[22] Filed: Apr. 23, 1991

[51] Int. Cl.$^5$ ............................................. A01K 87/00
[52] U.S. Cl. ......................................... 43/25.2; 43/25
[58] Field of Search ................................... 43/25, 25.2

[56] References Cited

U.S. PATENT DOCUMENTS

| | | | |
|---|---|---|---|
| 2,584,430 | 2/1952 | Dayton et al. | 43/25.2 |
| 2,721,413 | 10/1955 | Seidel | 43/25.2 |
| 3,815,273 | 6/1974 | Perkins | 43/25.2 |
| 5,025,585 | 6/1991 | Powell | 43/25 |

Primary Examiner—Richard K. Seidel
Assistant Examiner—Patty E. Hong
Attorney, Agent, or Firm—John D. Kaufmann

[57] ABSTRACT

Crushing or other damage to the hackle of an artificial fishing fly during transport of a fly rod is prevented by a device which includes a base member and a clip engageable by the hook of the fishing fly. A first facility mounts the base member in close proximity to the rod near its handle. A second facility mounts the clip to the base member for selective movement between two positions. In the first position, the clip is retracted and physically proximate to the base member and the rod so that the base member and the clip present a low profile and do not interfere with the line during fly casting. In the second position, the clip protrudes and extends away from the base member and the rod by a distance sufficient to hold the hackle of a fly away from and out of contact with the base member and the rod when the hook engages the clip thereby preventing crushing of the hackle during transport of the rod.

11 Claims, 2 Drawing Sheets

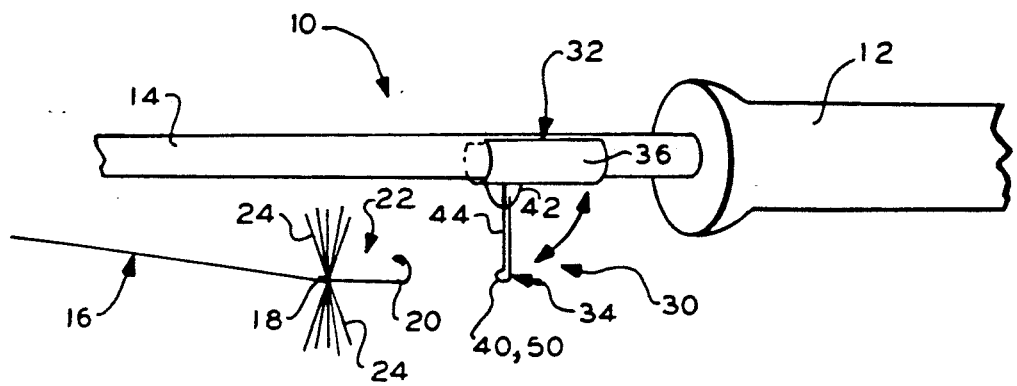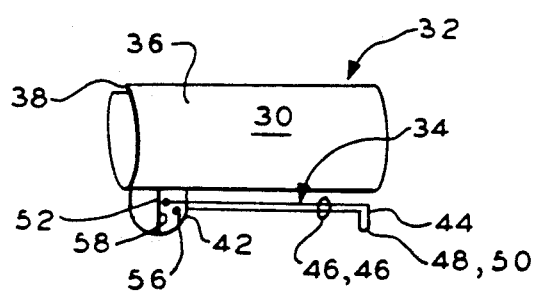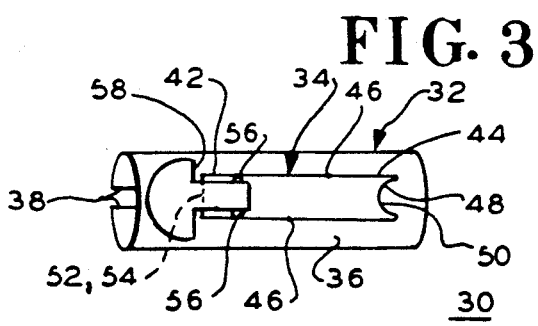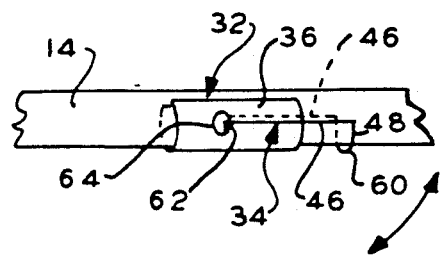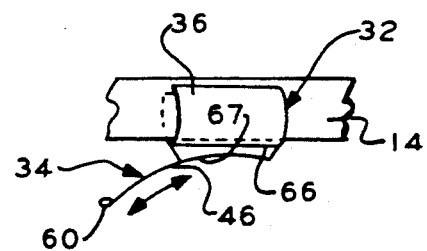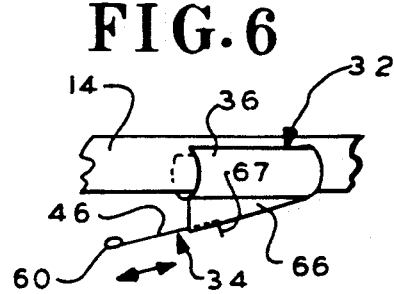

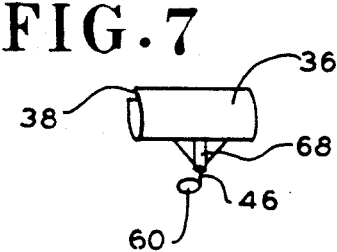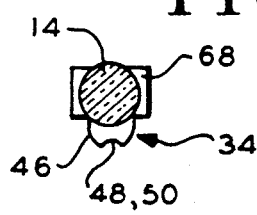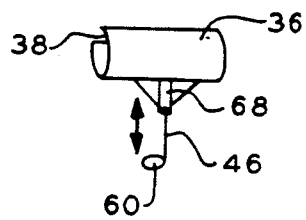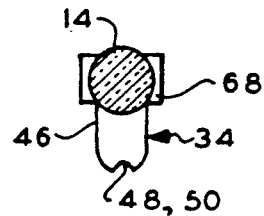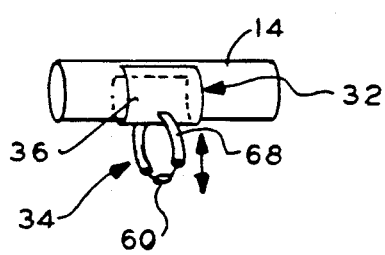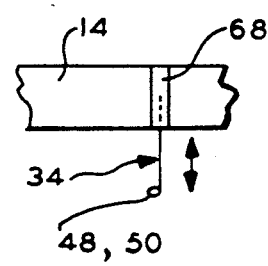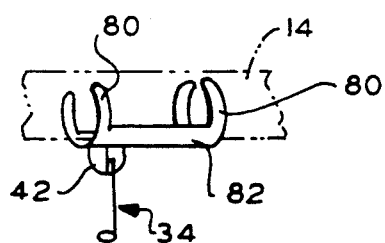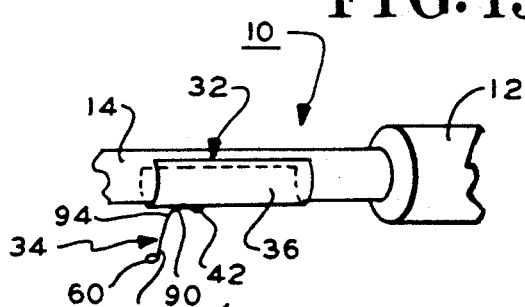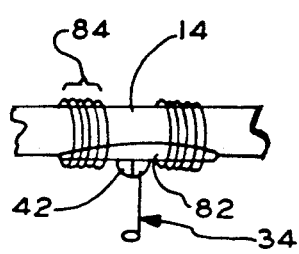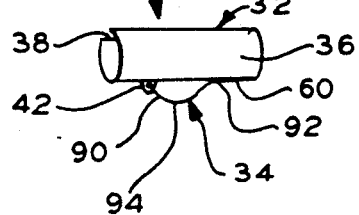

DEVICE FOR PREVENTING DAMAGE TO A FISHING FLY HACKLE

BACKGROUND OF THE INVENTION

The present invention relates to a device for preventing damage to a fishing fly hackle, and more particularly to a device which protects a fishing fly hackle against being crushed while an associated fly rod is being moved to another location.

A fishing fly comprises a hook on which is mounted a hackle, typically a tuft of feathers tied onto the hook. It is usually desirable to immobilize the hook when moving the rod to another location in order to avoid inadvertent snagging or hooking of objects or people. One method of immobilizing the hook is to engage it with a portion of the rod or a protrusion on the rod. Following such engagement, tension is applied to the line to one end of which the fly is tied to anchor the hook to maintain the hook-protrusion engagement. This tension is effected by operating a reel to which the other end of the line is connected. Such operation of the reel, which is typically mounted on or near a handle of the rod, tightens the line, which passes from the reel to the end of the rod remote from the reel, and then passes backwardly toward the handle.

The foregoing "storage" of a fly and immobilization of its hook can lead to the hackle of the fly being crushed and otherwise damaged by its contact with the rod. If a protruding member on the rod is provided which is sufficiently far from the rod to avoid the hackle contacting the rod, the protrusion may interfere with fly fishing, as by snagging the line during casting. If the protrusion is located closely enough to the rod to not interfere with casting, the hackle is likely to be crushed.

An object of the present invention is the avoidance of the above-described problems.

SUMMARY OF THE INVENTION

The above and other objects are achieved by the present invention which comprises an improved device for preventing crushing or other damage to the hackle on the hook of a fishing fly during transport of a fly rod. The fly is tied to one end of a line. The other end of the line is associated with the rod by a reel mounted on or near the handle of the rod. The line runs from the reel to and beyond the end of the rod remote from the handle so that if the hook is immobilized near the handle of the rod, tensioning the line will maintain this immobilization.

The improved device includes a base member and a clip engageable by the hook. First facilities mount the base member to the rod near the handle. Second facilities mount the clip to the base member for selective movement between two positions. In the first clip position, the clip is retracted and physically proximate to or nested with the base member. In this fashion the base member and the clip together present a low profile and do not interfere with the line during fly casting.

In the second position of the clip, the clip is protrudent and extends away from the base member and the rod by a distance sufficient to hold the hackle of the fly away from and out of contact with both the base member and the rod when the hook engages and is immobilized by the clip. Accordingly, when the hook of the fly engages the clip and the line is taut, the hackle cannot be crushed or otherwise damaged during transport of the rod by coming into contact therewith.

BRIEF DESCRIPTION OF THE DRAWING

FIG. 1 is a perspective view of a fly fishing rod on which is mounted a device according to this invention for preventing damage to the hackle of a fly;

FIGS. 2 and 3 are, respectively, perspective views of the apparatus of FIG. 1 according to the present invention;

FIGS. 4–16 are alternative embodiments of the invention as shown in FIGS. 1–3.

DETAILED DESCRIPTION

FIG. 1 depicts a portion of a fly fishing rod 10 which includes a handle 12 and a flexible shaft 14. A fishing line 16 (or leader attached to the line) extends from a reel (not shown) mounted on or near the handle 12 to which one end of the line 16 is attached. The other end 18 of the line 16 passes along the shaft 14 and through a guide (not shown) on the end thereof remote from the reel.

When the rod 10 is to be moved, as when changing fishing location, a hook 20 of a fishing fly 22, which also includes a hackle 24, may be immobilized as by engaging it with a line guide or, if the handle 12 is covered with a material such as cork, by inserting the hook into the handle. Following this, the line 16 is made taut by operating the reel to anchor the hook 20.

The foregoing can result in damage to the hackle 24 of the fly 22. Typically such damage is caused by the hackle 24 being crushed against the handle 12 or shaft 14 of the rod 10. If a protruding hook-engaging site is provided which prevents this crushing, it may snag the line 16 and otherwise interfere with casting.

Referring to FIGS. 1–3 a first embodiment of the present invention is shown. The device 30 of the present invention includes a base member 32 and a clip 34 engageable by the hook 20. In FIGS. 1–3 the base member 32 is a cylinder 36 and may be made of a resilient material with a longitudinal slit 38 therethrough. The slit 38 may be opened to permit the cylinder 36 to be placed over and surround the shaft 14, following which its resiliency will close the slit 38 to conformally mount the cylinder 36 to the shaft 14. The cylinder 36 may also be made of a deformable material which can be more or less permanently, conformally deformed onto the shaft 14.

The clip 34 is mounted to the base member 32 for movement between a first and a second position. In FIGS. 1–3 this mounting is achieved by a tab 42 attached to or formed integrally with the base member 32. The clip 34 may be a generally U-shaped member 44 having parallel legs 46 and a connecting bridge 48. The bridge 48 may include a hook-engageable site, such as a portion 50 of the bridge 48 which is deformed out of the plane of the legs 46.

The tab 42, which may have any convenient dimensions, may include a passageway 52 in which is pivotally held a pin 54 connected between the free ends of the legs 46. The pin 54 may comprise an appropriately formed integral portion of the clip 34. The tab 42 may include raised portions or bumps 56 which maintain the clip 34 in its first or retracted position which is physically proximate with and nested relative to the base member 32 and the shaft 14. The clip may be pivoted on the pin 54 to its second protrudent position which extends away from and is substantially perpendicular to the base member 32 and the shaft 14 by manually forcing the legs past the raised portions 56. Pivoting out of or beyond the second position due to tension on the line 16 when the hook 20 engages the clip 34 may be limited by stop surfaces 58 against which the legs 46 abut in the second position. The stop surfaces 58 may be surface features added to or formed integrally with the tab 42.

In FIG. 4, the hook engageable site is an eyelet 60 attached to or formed integrally with the bridge 48. Inwardly bent ends of the legs 46 are pivoted directly in holes 62 formed in the cylinder 36, which may carry a stop member 64 to limit movement of the clip 34 out of the second position in the same manner as the stop surfaces 58. The bridge 48 is formed to conformally engage the shaft 14 when the clip 34 is in the first position. In FIG. 4, as in FIGS. 5–14 reference numerals which are the same as in earlier Figures refer to the same or similar elements.

In FIGS. 5 and 6, the cylinder 36 mounts a sheath 66 into or out of which the clip 34, which here comprises a single leg 46 with no second leg 46 or bridge 48, may be telescoped. Similar to FIG. 4, an eyelet 60 is located at the terminus of the leg 46. In FIG. 5, the leg 46 follows a curved path in moving into and out of the sheath 66 to assume the first and second positions, respectively. If the leg 46 is resilient, the friction attendant to following the curved path can prevent inadvertent movement of the leg 46. In FIG. 6, the leg 46 follows a straight path. In both FIGS. 5 and 6 a bend 67 may be formed in the end of the leg 46 opposite the eyelet 60 to engage a stop surface or the like when the leg 46 is fully withdrawn.

In FIGS. 7 and 8 the cylinder 36 mounts a tube 68 into and out of which the single leg 46, similar to that shown in FIGS. 5 and 6, is telescopable.

FIGS. 9–11 depict an embodiment having a clip 34 similar to that shown in FIGS. 1–3, which instead of pivoting on the cylinder 36, is movable by its legs 46 being telescoped into and out of tubes 68 similar to the single tube in FIGS. 7 and 8. In this embodiment, the tubes 68 which together constitute a base member, may be directly mounted to the shaft 14 on diametric opposite sides thereof. The embodiment of FIG. 12 is similar to that of FIGS. 9–11, but the tubes 68 are carried by the cylinder 36, are closer together and are not diametric on the cylinder 36, and the eyelet 60 is present.

FIG. 13 is similar to FIG. 1, with the cylinder 36 being replaced by two split rings 80 interconnected by a strut 82. The tab 42 similar to that of FIG. 1 may be carried by the strut 82 near one of the rings 80 or at any other convenient location on the strut 82. Like the cylinder 36, the rings may be resilient; they may also be permanently deformable to encompass the shaft 14 of the rod 10, as may the cylinder 36.

In FIG. 14, the strut 82 of FIG. 13 is used alone and is permanently mounted to the shaft 14 by thread 84 or the like wound about the ends of the strut 82 and the shaft 14. The thread 84 may be replaced by any other appropriate encircling facilities such as tape or rings.

FIGS. 15 and 16 depict a preferred embodiment of the device 30 of the present invention. The device 30 of these Figures, similar to other Figures, includes the base member 32, the tab 42, and the eyelet 60. The clip 34 of this preferred embodiment is S-Shaped, with one end of the S being the eyelet 60 and the other end rotatably attached to and held by the tab 42. As shown in FIG. 15, when the clip 34 is in its second protrudent position to locate the eyelet 60 for insertion thereinto of the hook 20, a proximate leg 90 of the S-Shaped clip 34 abuts the cylinder 36 to prevent movement of the clip 34. When the clip 34 is in its first, retracted position (FIG. 16), a distal leg 92 of the S clip 34 and the eyelet 60 abut the cylinder 36. Further, an intermediate portion 94 of the clip 34 protrudes away from the cylinder in the first position of the clip 34. This portion 94 may serve as a keeper for streamers, wet flies or the like which are not damaged by proximity to the shaft 14 and need not be held away therefrom.

Those skilled in the art will appreciate that other embodiments of the present invention may be achieved without departing from the spirit and scope hereof as set forth in the following claims.

I claim:

1. An improved device for preventing crushing or other damage to the hackle on the hook of an artificial fishing fly during transport of a fly rod, the fly being tied to one end of a line, the other end of which is connected to the rod by a fishing reel mounted to the handle of the rod, the line running from the reel to and beyond the end of the rod remote from the handle; wherein the improvement comprises:
   (a) a base member;
   (b) a clip engageable by the hook, the clip being a U-shaped member having two parallel legs and a bridge therebetween, the bridge having a hook-engageable portion;
   (c) first means for mounting the base member in close proximity to the rod near the handle; and
   (d) second means for mounting the clip to the base member for selective movement between two positions,
      (i) in the first position the clip being retracted so as to be physically proximate to the base member and the rod so that the base member and the clip present a low profile and do not interfere with the line during fly casting, and
      (ii) in the second position the clip being protrudent and extending away from the base member and the rod by a distance sufficient to hold the hackle of a fly away from and out of contact with both the base member and the rod when the hook of the fly engages the clip and the line is taut, whereby the hackle is not crushed or otherwise damaged during transport of the rod.

2. An improved device as in claim 1, wherein:
the hook-engageable portion is a portion of the bridge deformed out of the plane of the legs.

3. An improved device as in claim 1, wherein:
the hook-engageable portion is an eyelet carried by the bridge.

4. An improved device as in claim 1, wherein:
the second mounting means comprises a tubular member surrounding and frictionally engaging each of the legs for movement into and out of the tubular member as the clip assumes the first and second positions.

5. An improved device as in claim 1, wherein:
the second mounting means comprises
   a tab carried by the base member, the tab having holes therethrough to pivotably mount a pin carried by the free ends of the legs of the U-shaped member.

6. An improved device as in claim 5, which further comprises:
   means on the tab for holding the U-shaped member generally parallel to the rod in the first position of the clip absent intentional manual movement of the clip to the second position, and means on the tab for limiting pivoting of the U-shaped member past a position which is generally perpendicular to the rod to define the second position of the clip.

7. An improved device for preventing crushing or other damage to the hackle on the hook of an artificial fishing fly during transport of a fly rod, the fly being tied to one end of a line, the other end of which is connected to the rod by a fishing reel mounted to the handle of the rod, the line running from the reel to and beyond the end of the rod remote from the handle; wherein the improvement comprises:
  (a) a base member;
  (b) a clip engageable by the hook, the clip being an S-shaped member one end of which is pivotally mounted to the base and the other end of which is engageable by the hook;
  (c) first means for mounting the base member in close proximity to the rod near the handle; and
  (d) second means for mounting the clip to the base member for selective pivotal movement between two positions,
    (i) in the first position the clip being retracted so as to be physically proximate to the base member and the rod so that the base member and the clip present a low profile and do not interfere with the line during fly casting, and
    (ii) in the second position the clip being protrudent and extending away from the base member and the rod by a distance sufficient to hold the hackle of a fly away from and out of contact with both the base amember and the rod when the hook of the fly engages the clip and the line is taut, whereby the hackle is not crushed or otherwise damaged during transport of the rod.

8. An improved device as in claim 7, wherein:
in the first position of the clip, a portion of the S remote from the second means engages the base member so that the portion engageable by a non-damageable fly streamer or the like is a portion of the S between the second mounting means and the engagement between the clip and the base member.

9. An improved device as in claim 7, wherein:
the clip is shaped so that in its first position a portion thereof protrudes away from the base member and is engageable by the type of fly, streamer or the like which is not damaged by proximity to the rod.

10. An improved device as in claim 7, which further comprises:
means for holding the clip in its second position against the force exerted by the taut line.

11. An improved device as in claim 10, wherein:
the means for holding the clip in its second position constitutes a portion of the S adjacent to the second means which engages the base.

* * * * *